United States Patent
Hung

(10) Patent No.: US 11,713,617 B2
(45) Date of Patent: Aug. 1, 2023

(54) ANGLE ADJUSTING MECHANISM FOR BLINDS BLADES

(71) Applicant: Chih-Shen Hung, Xihu Township, Changhua County (TW)

(72) Inventor: Chih-Shen Hung, Xihu Township, Changhua County (TW)

(*) Notice: Subject to any disclaimer, the term of this patent is extended or adjusted under 35 U.S.C. 154(b) by 95 days.

(21) Appl. No.: 17/120,258

(22) Filed: Dec. 13, 2020

(65) Prior Publication Data

US 2022/0186555 A1 Jun. 16, 2022

(51) Int. Cl.
*E06B 9/322* (2006.01)
*F16H 1/16* (2006.01)

(52) U.S. Cl.
CPC ............... *E06B 9/322* (2013.01); *F16H 1/16* (2013.01)

(58) Field of Classification Search
CPC ... E06B 9/26; E06B 9/30; E06B 9/322; E06B 9/323; E06B 9/327; E06B 9/32; E06B 9/74; E06B 9/76; E06B 9/78; E06B 2009/3225; E06B 2009/3227; E06B 2009/285; E06B 2009/3222; F16D 1/101; F16D 2001/102
USPC .......... 74/510; 160/176.1 R, 176.1 V, 174 R, 160/175, 166.1
See application file for complete search history.

(56) References Cited

U.S. PATENT DOCUMENTS

| | | | | |
|---|---|---|---|---|
| 5,002,113 A | * | 3/1991 | Georgopoulos | E06B 9/307 160/176.1 R |
| 5,092,387 A | * | 3/1992 | King | E06B 9/76 160/176.1 R |
| 6,308,764 B1 | * | 10/2001 | Lin | E06B 9/322 160/177 R |
| 6,325,133 B1 | * | 12/2001 | Lin | E06B 9/322 160/177 R |
| 10,053,909 B2 | * | 8/2018 | Wang | E06B 9/44 |
| 10,597,937 B2 | | 3/2020 | Huang et al. | |
| 10,975,618 B2 | * | 4/2021 | Lin | E06B 9/307 |
| 2016/0138334 A1 | * | 5/2016 | Dean | E06B 9/42 74/416 |
| 2017/0022754 A1 | * | 1/2017 | Nien | E06B 9/307 |
| 2018/0363709 A1 | * | 12/2018 | Chen | F16H 1/16 |
| 2019/0003252 A1 | * | 1/2019 | Huang | F16D 1/101 |
| 2019/0032401 A1 | * | 1/2019 | Hong | E06B 9/307 |

FOREIGN PATENT DOCUMENTS

| | | | | |
|---|---|---|---|---|
| CH | 633073 A5 | * | 2/1979 | |
| EP | 1201951 A1 | * | 5/2002 | ............... E06B 9/76 |
| FR | 2800121 A1 | * | 4/2001 | ............... E06B 9/68 |

* cited by examiner

*Primary Examiner* — T. Scott Fix

(57) ABSTRACT

An angle adjusting mechanism for blinds blades has a main body and a driving unit. The worm gear of the driving unit is housed in the first container of the main body, and the worm and the connecting rod of the driving unit are positioned in the second container of the main body. The worm and the worm gear engage with each other, and the pivot extension at the end of the connecting rod is located at the second opening of the main body and does not protrude from the main body, which avoids transportation damage and greatly reduces the volume of the adjustment mechanism. For the purpose of quick disassembly and assembly, the driving rod of the driving unit is also assembled with the connecting rod, and of the driving rods are designed with several different sizes, so that the adjusting mechanism can change the driving rod at according to the size of the blinds blades.

6 Claims, 14 Drawing Sheets

A-A

B-B

ANGLE ADJUSTING MECHANISM FOR BLINDS BLADES

BACKGROUND OF INVENTION

Field of Invention

The present invention relates to an adjusting mechanism for blinds blades, and more particular to an angle adjusting mechanism for blinds blades.

Description of Related Art

Presently, the blinds blades are tied between an upper rail and a lower rail, and a number of the blades are connected in series with several ropes. The operation of the blinds blades employs two ropes to control the opening or closing of the blinds. When the blinds blades are unfolded, the blades are controlled to tilt at a predetermined angle by rotating an adjusting rod to drive an adjustment structure installed in the upper rail to achieve the purpose of light projection adjustment.

A conventional adjustment structure, as shown in FIGS. 10 and 11, US20170022754, a separable tilting device includes a case 40, a worm gear 44, a worm 45 member, a connector 46, a hook 48, and a sleeve 47. The case 40 includes two sub-cases forming a chamber a case having a chamber 41 with a stopping blade 411. A first opening 42 and a lateral bore 43 are integrally formed on each of the sub-cases, wherein the first opening 42 and the lateral bore 43 communicate with the chamber 41. A worm 45 and a worm gear 44 are provided in the chamber 41 of the case 40, and are movable by each other. A part of the worm 45 is a helical structure, another part of the worm 45 is an engaging portion 451. The connector 46 is formed by a rod-like member, which has a first end 461, a second end 462 and an engaging slot 463 located between the first end 461 and the second end 462. The first end 461 of the connector 46 is placed through the second opening 43 of the case 40 to engage with the engaging portion 451 of the worm 45. The sleeve 47 fits around a lower segment of the connector 46 and the hook 48 is restricted from disengaging from the connector 46.

In the above-mentioned conventional structure, it is not difficult to find that there are still some shortcomings. The main reasons are as follows: When the connector 46 is combined with the worm 45, the engaging slot 463 engages with the stopping blade 411 of the chamber 41, which cannot be disassembled afterward. Furthermore, the second end 462 of the connector 46 is protruding outside the casing 40, which increases the packaging volume and leads to an increase in shipping costs. On the other hand, it is easy to damage and break the connector 46 due to shaking and collision during the shipping process, which leads to troubles in use and lack of practicality.

Moreover, another conventional adjustment structure, as shown in FIGS. 12, 13 and 14, U.S. Ser. No. 10/597,937, a slat angle adjustment mechanism for window blind assembly includes a case 50 having a chamber 51 therein, wherein the case 50 further has a first through hole 52, a second through hole 53, and a stop member 54 and a transmission unit 55. The first through hole 52 and the second through hole 53 communicate with the chamber 51. An end of the stop member 54 is connected to a peripheral edge of the first through hole 52, while another end thereof extends into the second through hole 53 toward the chamber 51. The transmission unit 55 is mounted in said accommodation chamber 51 of the case 50, said transmission unit 55 comprising a transmission gear set and a retractable member 58 connected to said transmission gear set. Said transmission gear set has a gear 56 and a screw rod 57 engaged with said gear 56. Said gear 56 defines therein a position-limiting hole 561 corresponding to the said second through hole 53 of said case 50. Said retractable member 58 is connected to said screw rod 57, said screw rod 57 has an extension shank 571, and said retractable member 58 is socketed into said extension shank 571 of said screw rod 57 and alternatively movable back and forth along a same axial direction with said extension shank 571 of said screw rod 57. Said retractable member 58 comprises a stop flange 581 limited between the stop member 54 of the chamber 51 and the screw rod 57, and said retractable member further has a ring hanger 582. When pulling said ring hanger 582 of said retractable member 58 to move said retractable member 58 along said extension shank 571 of said screw rod 57.

However, the above-mentioned conventional structure still has some shortcomings. The main reasons are as follows: Although the above-mentioned conventional adjuster can effectively retract the retractable member 58 into the chamber 51 of the case 50, after the retractable member 58 is combined with the base 50 and the extension shank 571 of the screw rod 57, the stop flange 581 at one end of the retractable member 58 is restricted by the stop member 54. When the structure is damaged, it cannot be drawn out for replacement or providing a different size selection and replacement. On the other hand, the conventional retractable design requires a larger storage space, and can only be designed and used normally on a general or larger adjuster. In a small adjuster, due to the limitations of space and length, the retractable design and operation effect cannot be applied, and there is still a need for improvement.

In addition, another conventional adjustment structure, as shown in FIGS. 15, 16 and 17, U.S. Pat. No. 6,325,133, a modulating mechanism of venetian blind, has a housing 60 is formed of two housing and has a receiving space 61 and a shaft hole 62 connected to the receiving space 61. The worm gear 63 is pivotally mounted in the receiving space 61 of the housing 60 by means of a spindle 65. The worm shaft 64 is placed in shaft hole 62 of the housing 60 and one end of the worm shaft 64 is engaged with the worm gear 63 and another end has an axial threaded hole 641. The worm shaft 64 is formed of a link member 651 and an extension member 65 connected end to the link member 651. The extension member 65 is provided at the front end with a columnar portion 651 which is provided with two through holes 653, The rear end of the extension member 65 projects out of the housing 60 and is provided with a hook 654 and several stop units 66. The stop units 66 are disposed on the extension member 65 and are formed of a spring 661, a threaded rod 662, and a retaining block 663. The spring 661 is received in the through hole 653 such that one end of the spring 661 urges the shoulder. The threaded rod 662 is fitted into the spring 661. The retaining block 663 has a threaded hole 641. The threaded rod 662 is engaged with the threaded hole 641. The link member 64 and the extension member 65 are fastened end to end such that the retaining blocks 663 are retained in the section slots 642.

The above-mentioned conventional structure still some shortcomings. The main reasons are as follows: the above-mentioned conventional adjuster utilizes a detachable butt-jointed manner for the worm 64 and the extension member 65 to avoid broken extension member 65 and to reduce the packaging volume. However, the worm 64 and the extension member 65 are screwed through the screw 652 and the axial screw hole 641 through the screw combination and the engagement between the retaining blocks 663 are retained in the section slots 642, the worm 64 and the extension member 65 can be stably combined together. Therefore, the structural components are numerous and the assembly is not easy, and the volume and thickness of the worm 64 and the extension member 65 are limited, which greatly increases setting difficulty and causes inconvenience and troubles in the structure composition.

Therefore, it is desirable to provide an angle adjusting mechanism for blinds blades to mitigate and/or obviate the aforementioned problems.

SUMMARY OF INVENTION

An objective of present invention is to provide an angle adjusting mechanism for blinds blades, which is capable of improving the above-mention problems.

In order to achieve the above mentioned objective, An angle adjusting mechanism for blinds blades has a main body and a driving unit. The worm gear of the driving unit is housed in the first container of the main body, and the worm and the connecting rod of the driving unit are positioned in the second container of the main body. The worm and the worm gear engage with each other, and the pivot extension at the end of the connecting rod is located at the second opening of the main body and does not protrude from the main body, which avoids transportation damage and greatly reduces the volume of the adjustment mechanism. For the purpose of quick disassembly and assembly, the driving rod of the driving unit is also assembled with the connecting rod, and of the driving rods are designed with several different sizes, so that the adjusting mechanism can change the driving rod at according to the size of the blinds blades.

Other objects, advantages, and novel features of invention will become more apparent from the following detailed description when taken in conjunction with the accompanying drawings.

DETAILED DESCRIPTION OF PREFERRED EMBODIMENT

Figure 1:
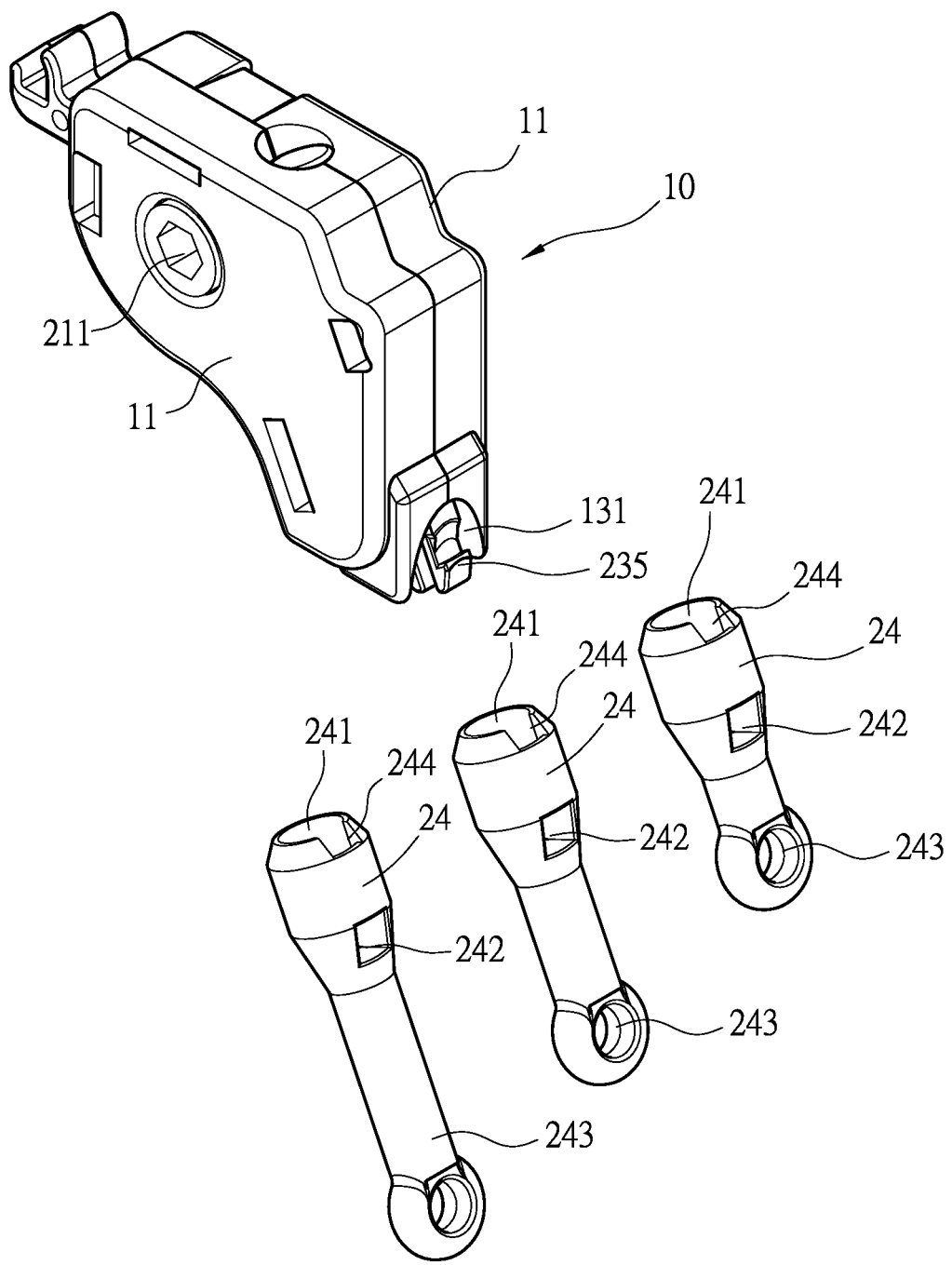
FIG. 1 is a three-dimensional view of a preferred embodiment according to the present invention.
Figure 2:
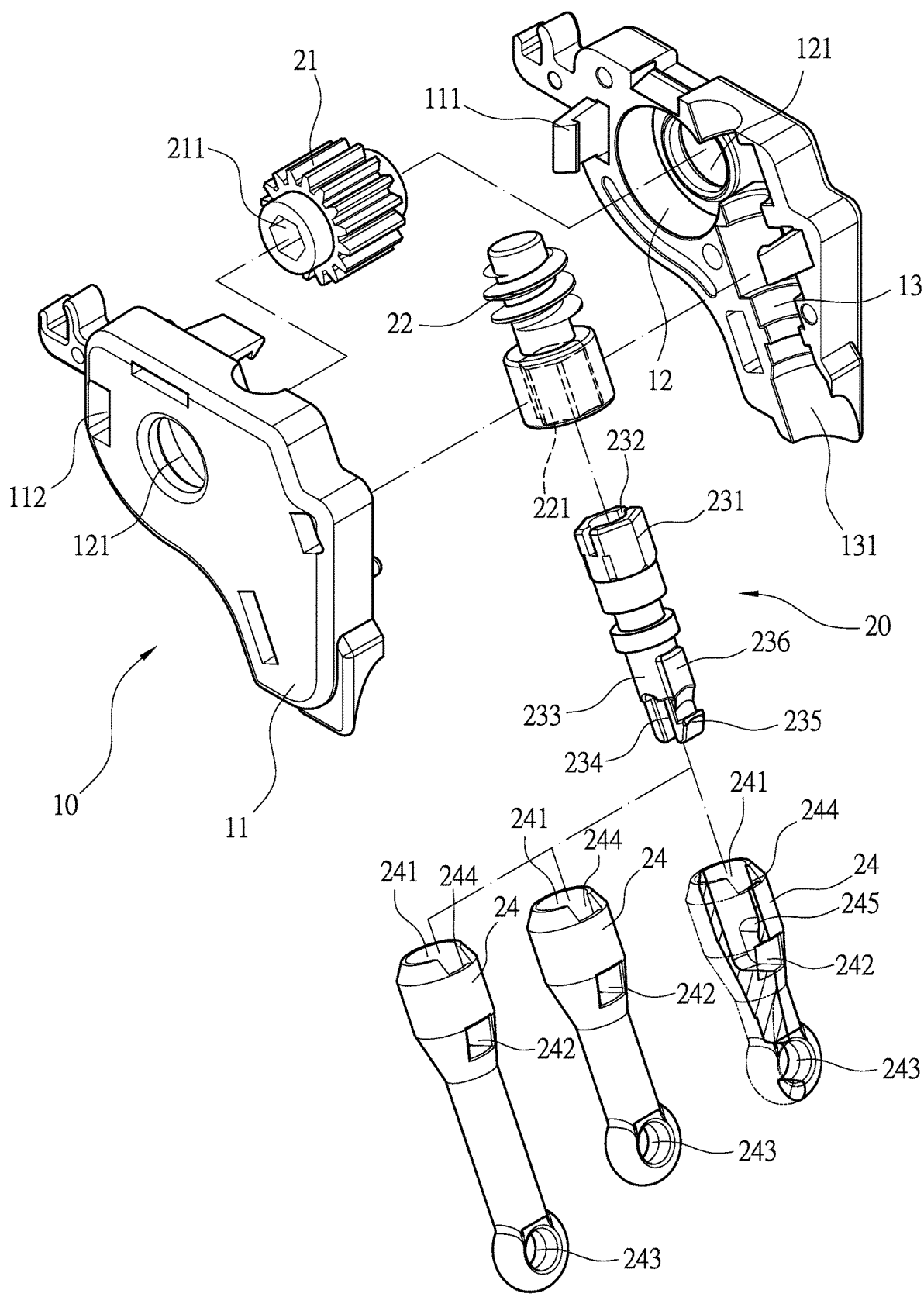
FIG. 2 is an exploded view of the preferred embodiment according to the present invention.
Figure 3:
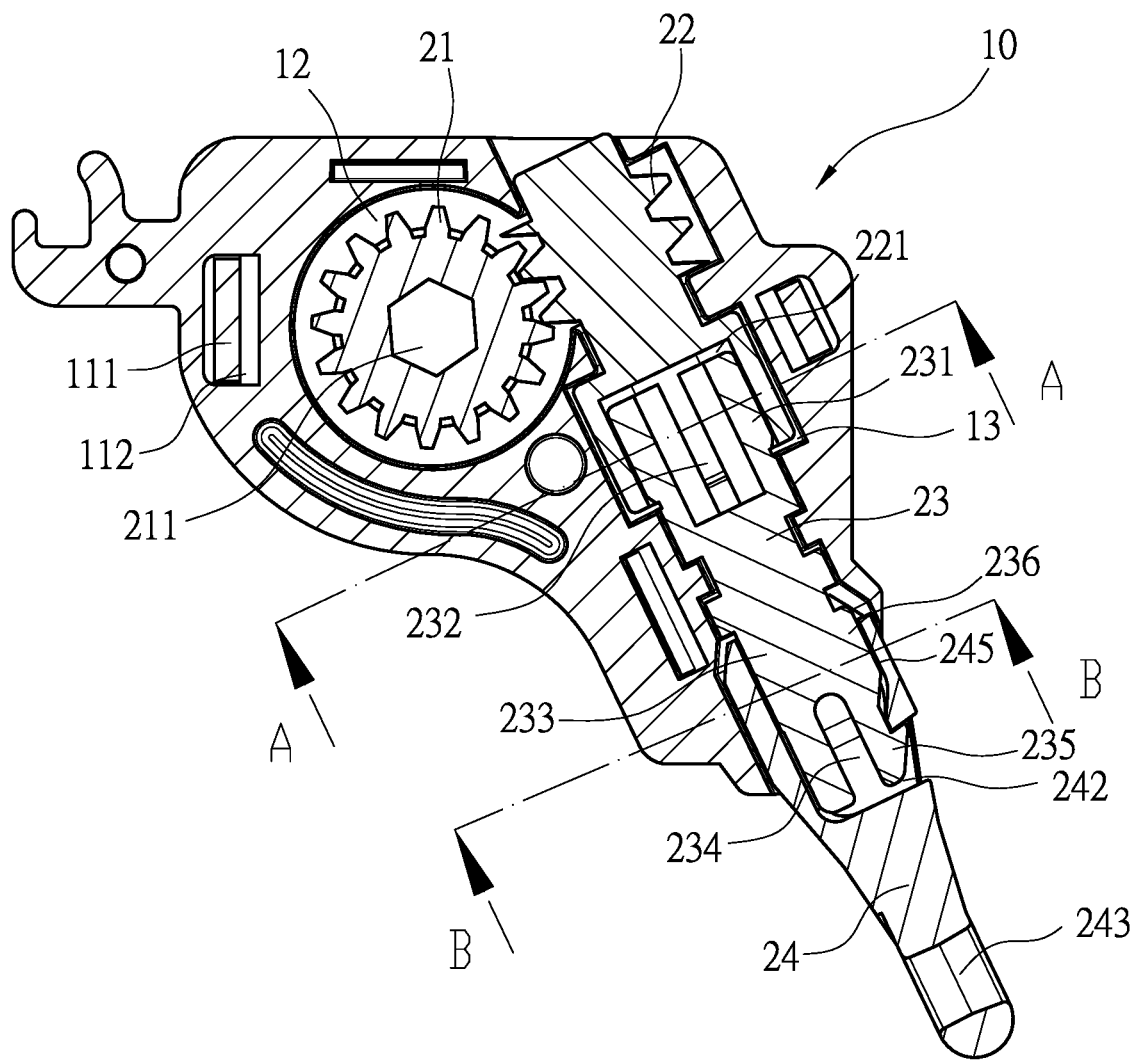
FIG. 3 is the combined cross-sectional view of the preferred embodiment according to the present invention.
Figure 4:
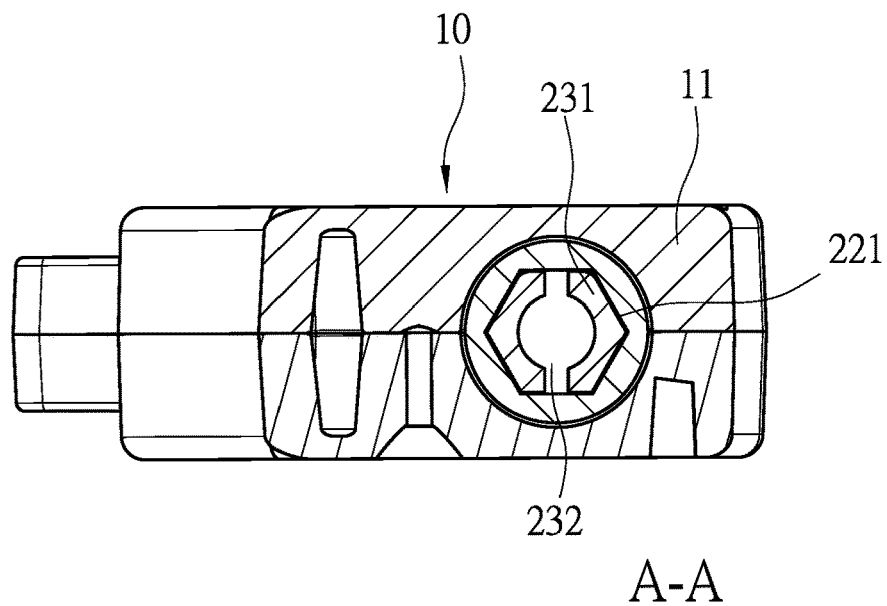
FIG. 4 is a cross-sectional view of the preferred embodiment according to the present invention corresponding to the section line A-A in FIG. 3.
Figure 5:
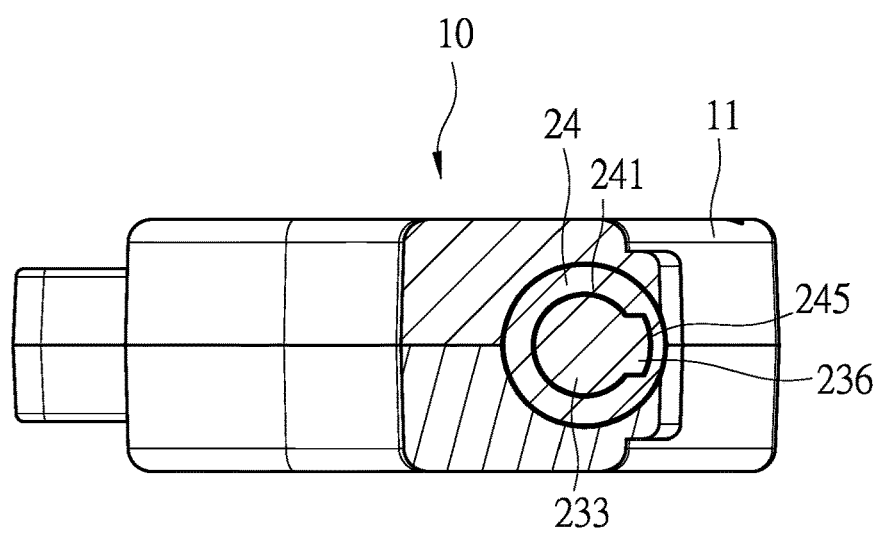
FIG. 5 is a cross-sectional view of the preferred embodiment according to the present invention corresponding to the section line B-B in FIG. 3.

Please refer to FIGS. 1-3. An angle adjusting mechanism for blinds blades comprises: a main body 10 and a driving unit 20. The main body 10 has two related casings 11, a first container 12 and a second container 13 connected to each other. The first container 12 has a first opening 121 through the two casings 11, and the second container 13 has a second opening 131 at an end. The two casings 11 further comprise a plurality of corresponding clasps 111 and slots 112 for combining the two casings 11 together. The driving unit 20 comprises a worm gear 21, a worm 22, a connecting rod 23, and at least one driving rod 24. The worm gear 21 is disposed in the first container 12 and has an assembling aperture 211 at an axle center corresponding to the first opening 121. The worm 22 further comprises a hexagonal socket 221 at one end, and the connecting rod 23 further has a hexagonal column 231 at one end. The hexagonal column 231 of the connecting rod 23 further comprises a groove 232 extending downward at one end. The worm 22 and the connecting rod 23 are combined via the hexagonal socket 221 and the hexagonal column 231, and the groove 232 makes the hexagonal column 231 to shrink and deform, so that when the connecting rod 23 drives the worm 22, the hexagonal column 231 shrinks and slides to avoid friction damage. The worm 22 is combined with the connecting rod 23 and installed in the second container 13, and the worm 22 engages the worm gear 21. The connecting rod 23 has a pivot extension 233 at one end corresponding to the second opening 131, and the pivot extension 233 has an axial groove 234 and an engaging portion 235 on an outer side of the groove 234. The driving rod 24 has a pivot recess 241 at an end with an engaging aperture 242 through the driving rod 24, and the driving rod 24 has a through aperture 243 at another end.

Furthermore, the worm 22 and the connecting rod 23 are integrally formed.

Moreover, the driving rods 24 have different lengths.

In addition, the pivot extension 233 of the connecting rod 23 further comprises a positioning protrusion 236, the pivot recess 241 of the driving rod 24 further comprises a guiding opening 244, and a positioning recess 245 is disposed in the pivot recess 241, wherein by aligning the positioning recess 245 and the positioning protrusion 236, the driving rod 24 and the connecting rod 23 are able to engage with each other.

For the assembly of the structure, please refer to FIGS. 2 to 5. The worm gear 21 is installed in the first container 12 of the casing 11, and the assembling aperture 211 of the worm gear 21 is exposed from the first opening 121. The worm 22 is assembled with the connecting rod 23 by combining the hexagon socket 221 with the hexagonal columnar 231, and then installed in the second container 13 of the casing 11. The worm gear 21 engages with the worm 22, the pivot extension 233 of the connecting rod 23 is relatively to the second opening 131 located at the end of the second container 13, so that the worm gear 21, the worm 22, and the connecting rod 23 are all restricted to the main body 10. The driving rod 24 is combined with the pivot extension 233 of the connecting rod 23 through the pivot recess 241 by a snap-fitting method, and secured through the engagement of the engaging portion 235 and the engaging aperture 242.

Figure 6:
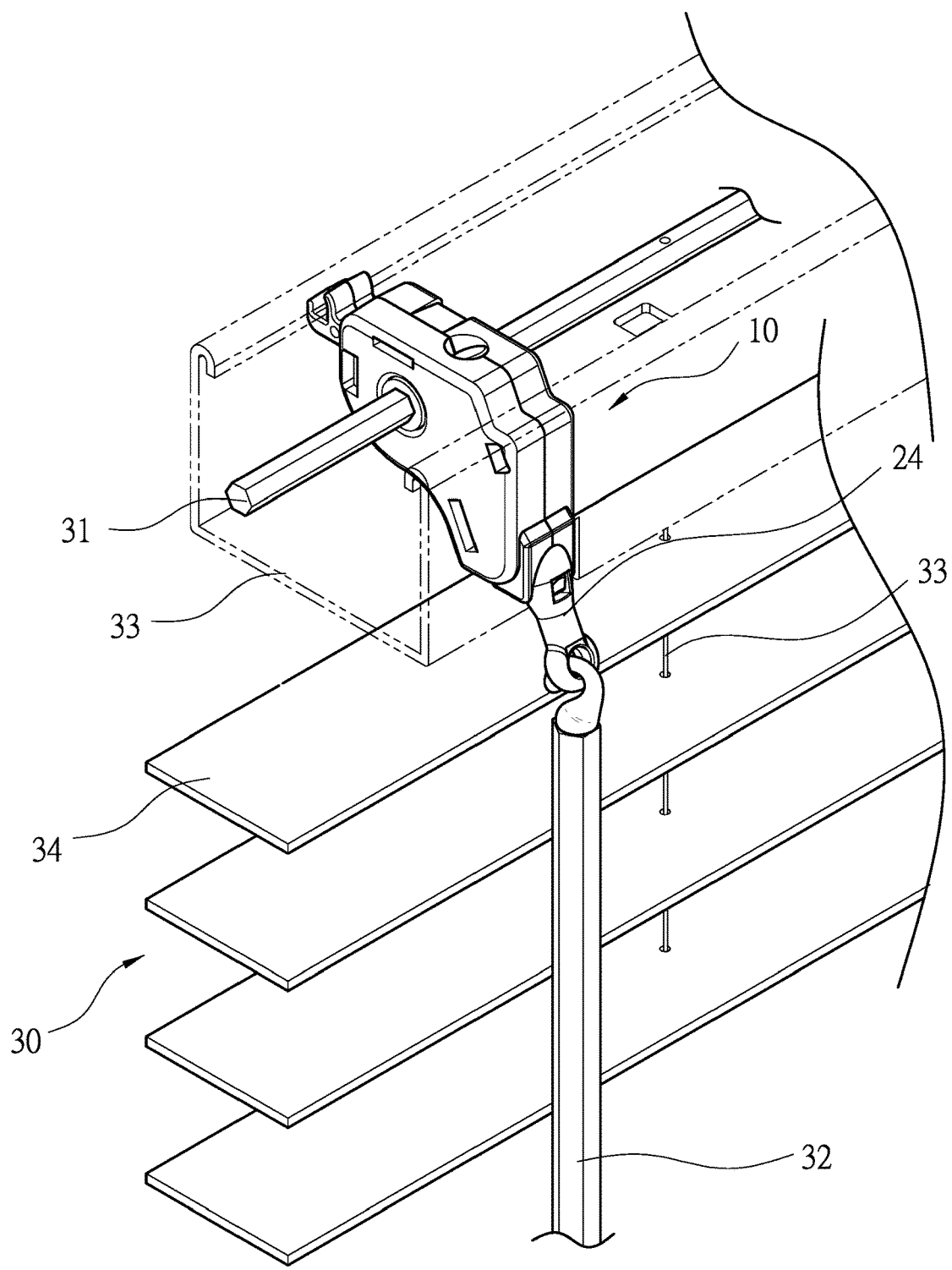
FIG. 6 is a schematic drawing of the actual installation and use of the preferred embodiment according to the present invention.
Figure 7:
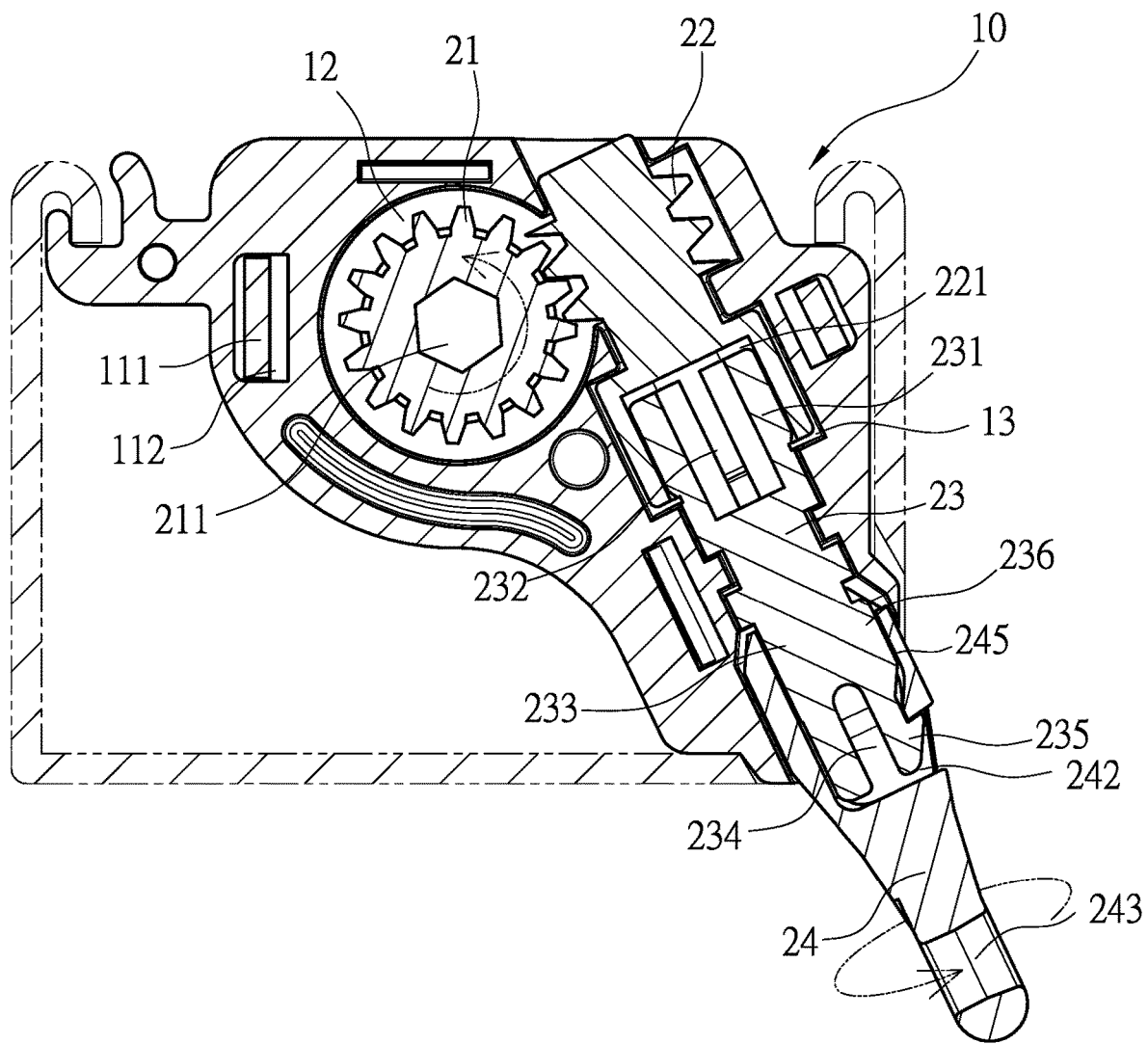
FIG. 7 is a schematic drawing of the rotation of the preferred embodiment according to the present invention.

For the actual operation of the above-mentioned structure, please refer to FIGS. 6 and 7. When an user assembles the adjustment mechanism to the blinds blades 30, the blades driving member 31 of the blinds blades 30 is fixed at the assembling aperture 211 of the worm gear 21, and the adjusting rod 32 of the blinds blades 30 is hung on the through aperture 243 of the driving rod 24. Therefore, when the user turns the adjusting rod 32 of the blinds blades 30 clockwise or counterclockwise, with the driving rod 24, the connecting rod 23 and the worm 22 combined in a synchronous operation, the worm gear 21 is driven to rotate clockwise or counterclockwise by the worm 22, then the blades driving member 31 to rotate through the worm gear 21, so that the pull string 33 of the blades driving member 31 and the blades 34 connected by the pull string 33 the can be rotated clockwise or counterclockwise with the adjustment rod 32, to achieve the effect of rewinding or releasing.

Figure 8:
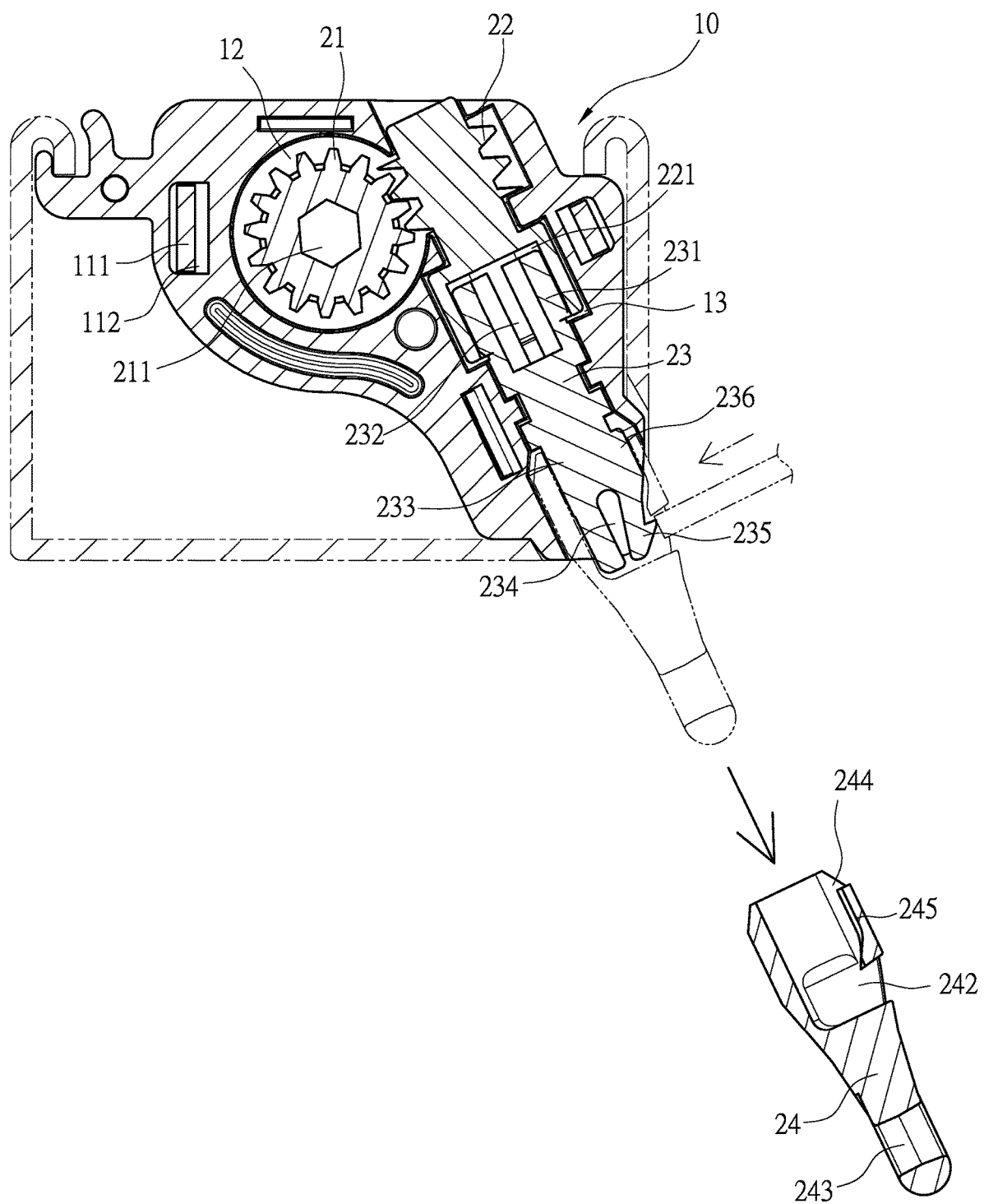
FIG. 8 is a schematic drawing showing the driving rod being removed by the connecting rod in the preferred embodiment according to the present invention.
Figure 9:
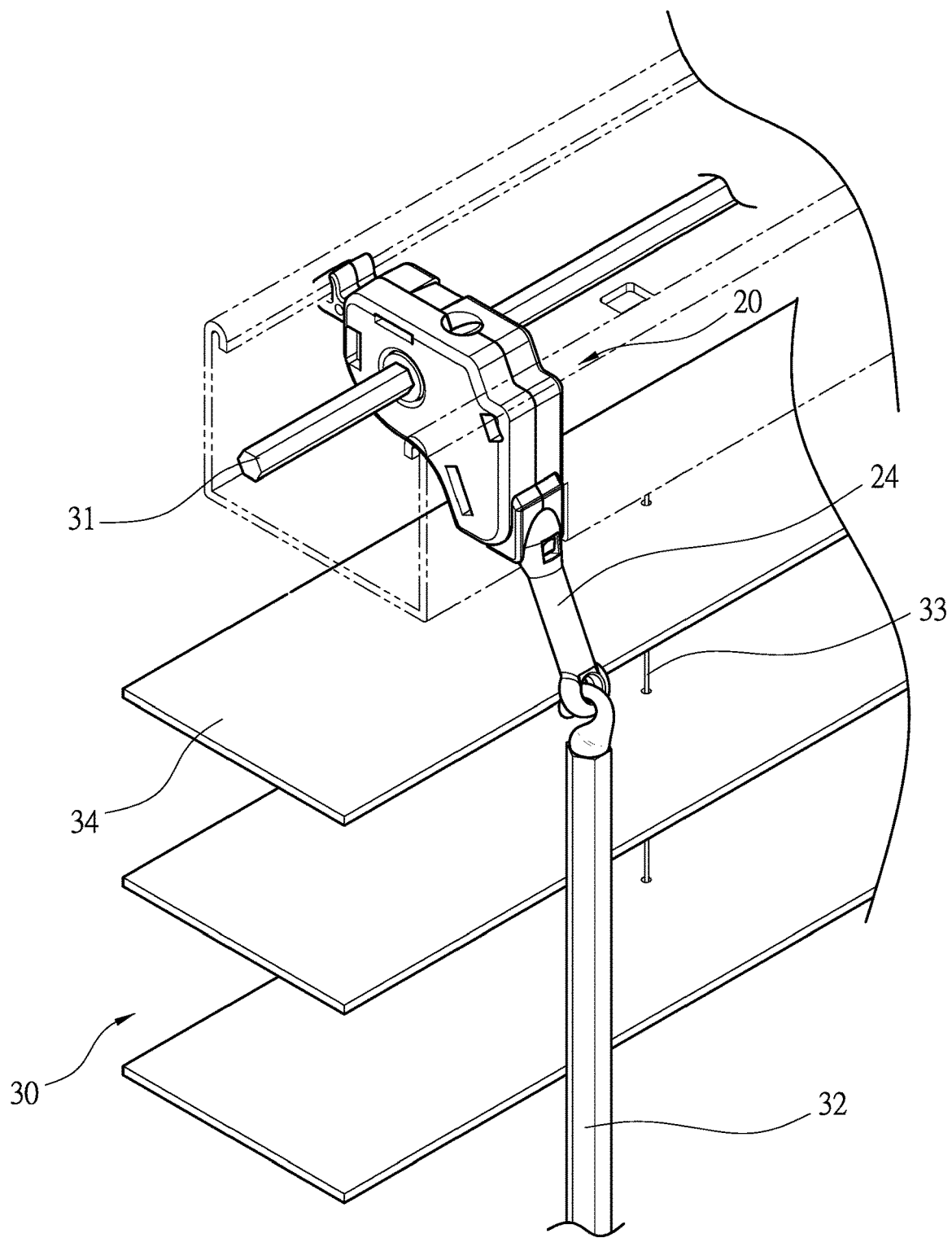
FIG. 9 is a schematic drawing showing the driving rod being replaced with other sizes in the preferred embodiment according to the present invention.
Figure 10:
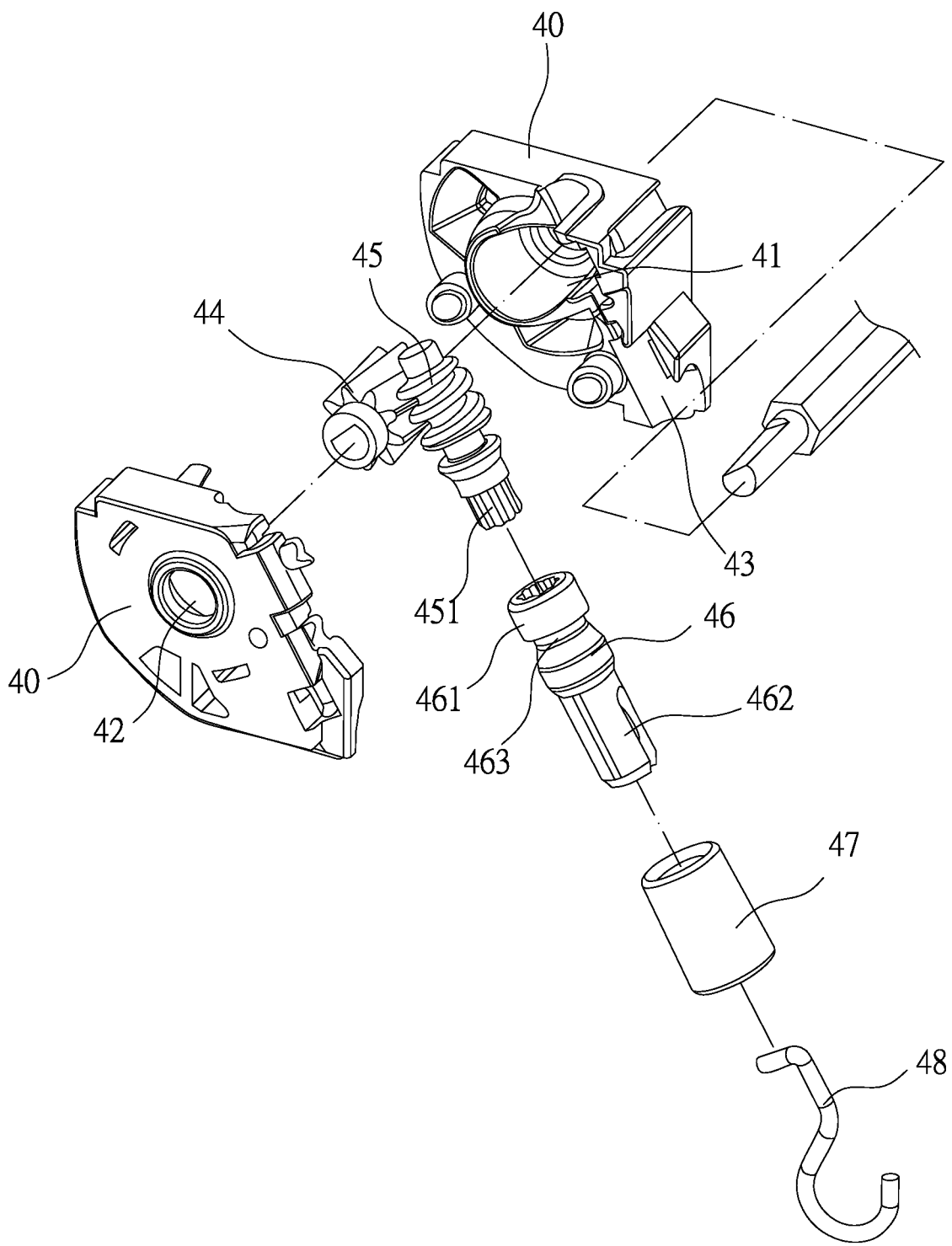
FIG. 10 is an exploded view of a conventional adjuster structure.
Figure 11:
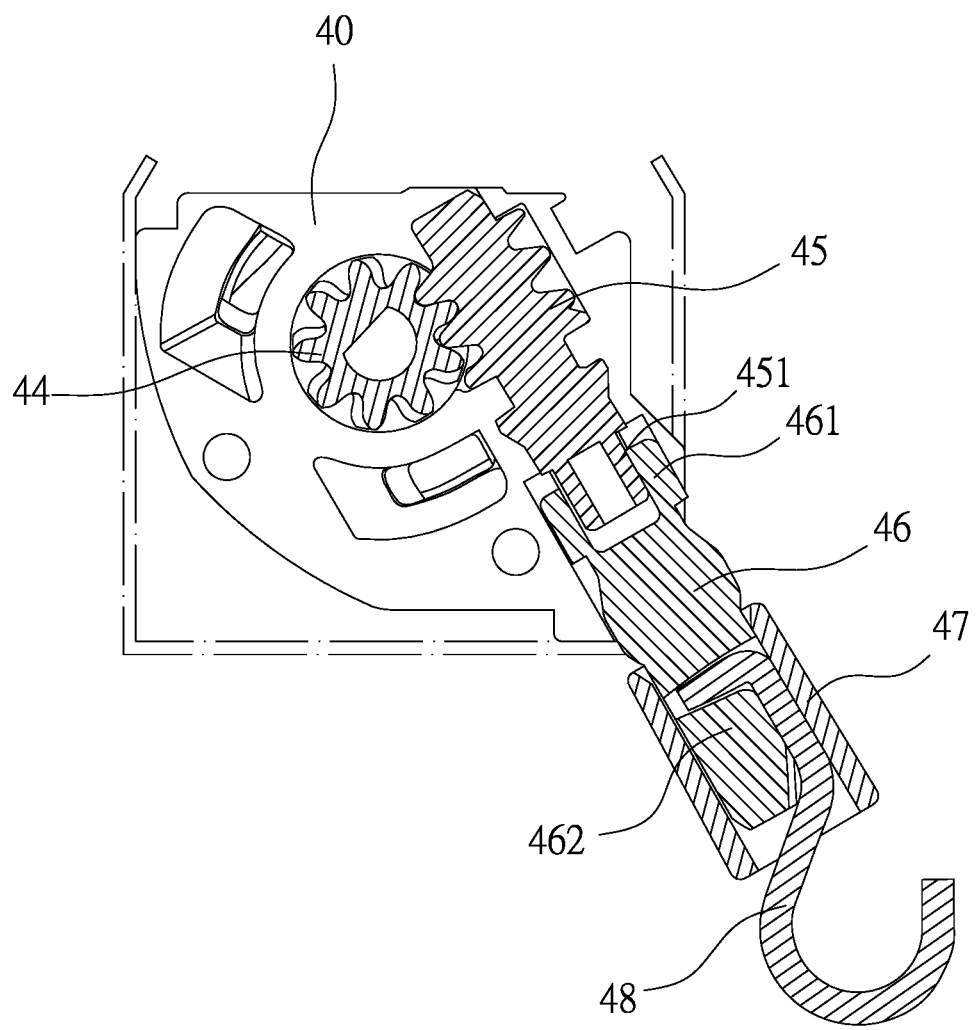
FIG. 11 is a cross-sectional view of the conventional adjuster structure.
Figure 12:
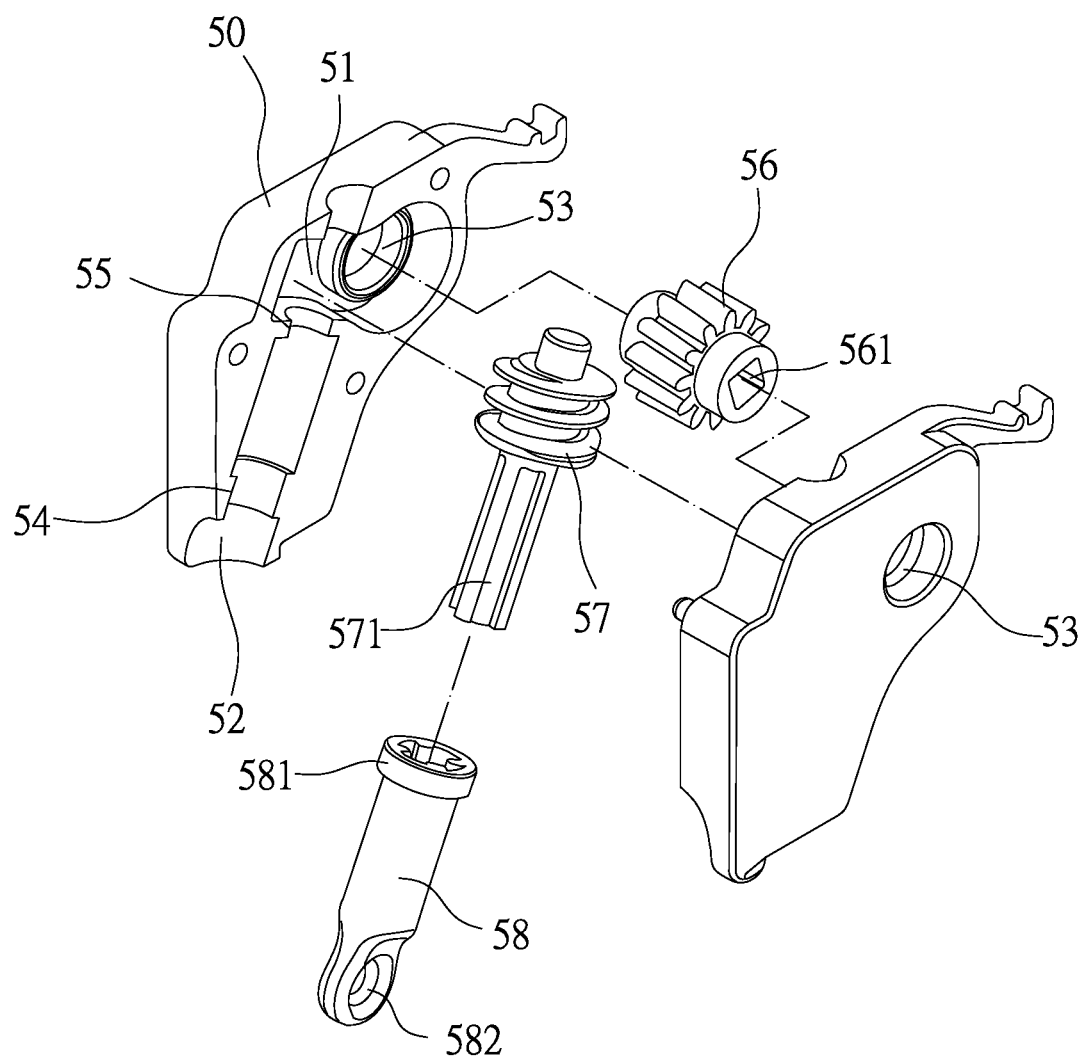
FIG. 12 is an exploded view of another conventional adjuster structure.
Figure 13:
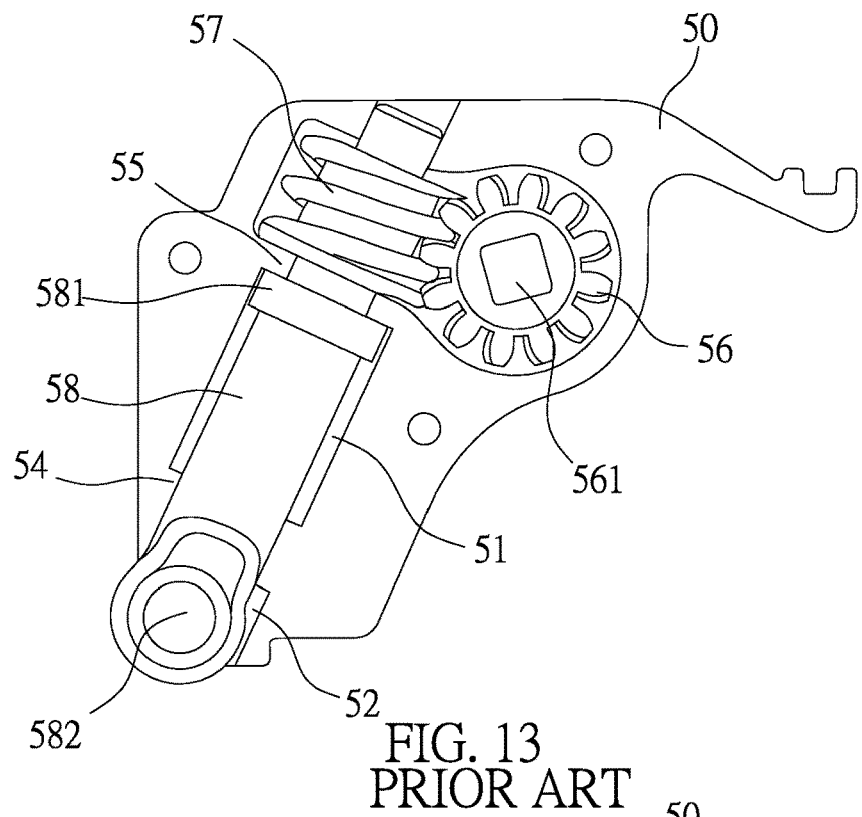
FIG. 13 is a schematic drawing showing another conventional adjuster structure with the retractable member hidden.
Figure 14:
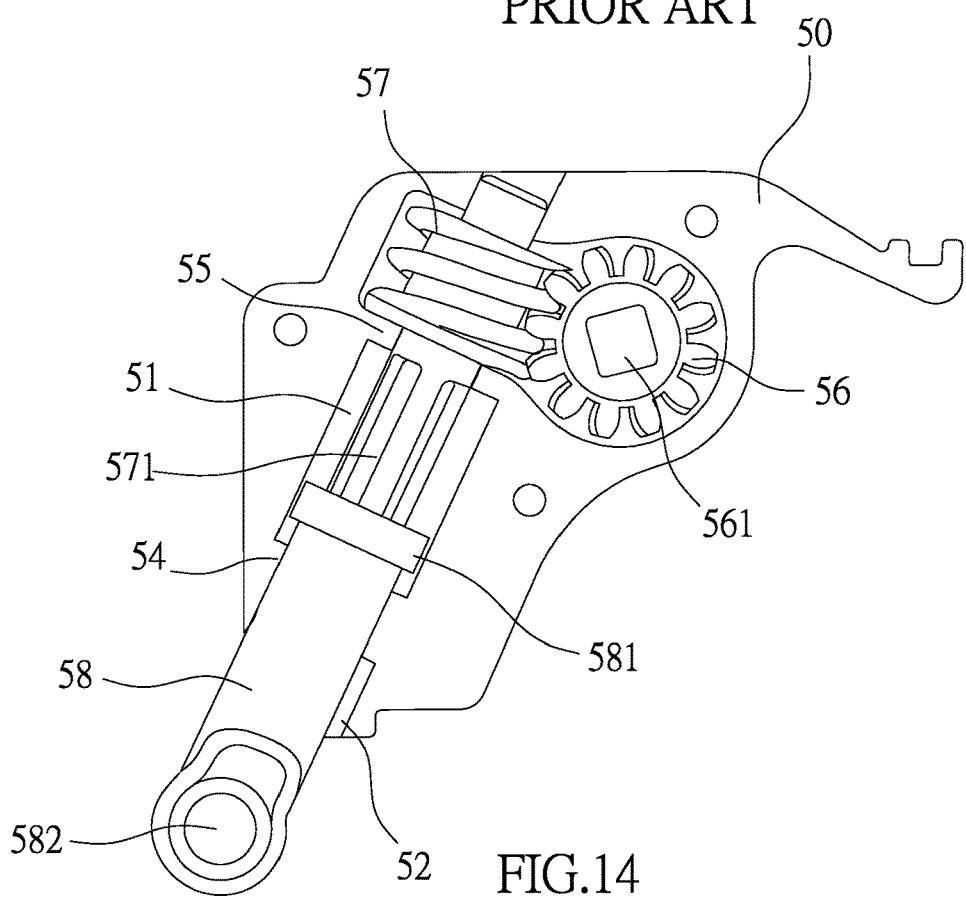
FIG. 14 is a schematic diagram showing another conventional adjuster structure with the retractable member extending outward.
Figure 15:
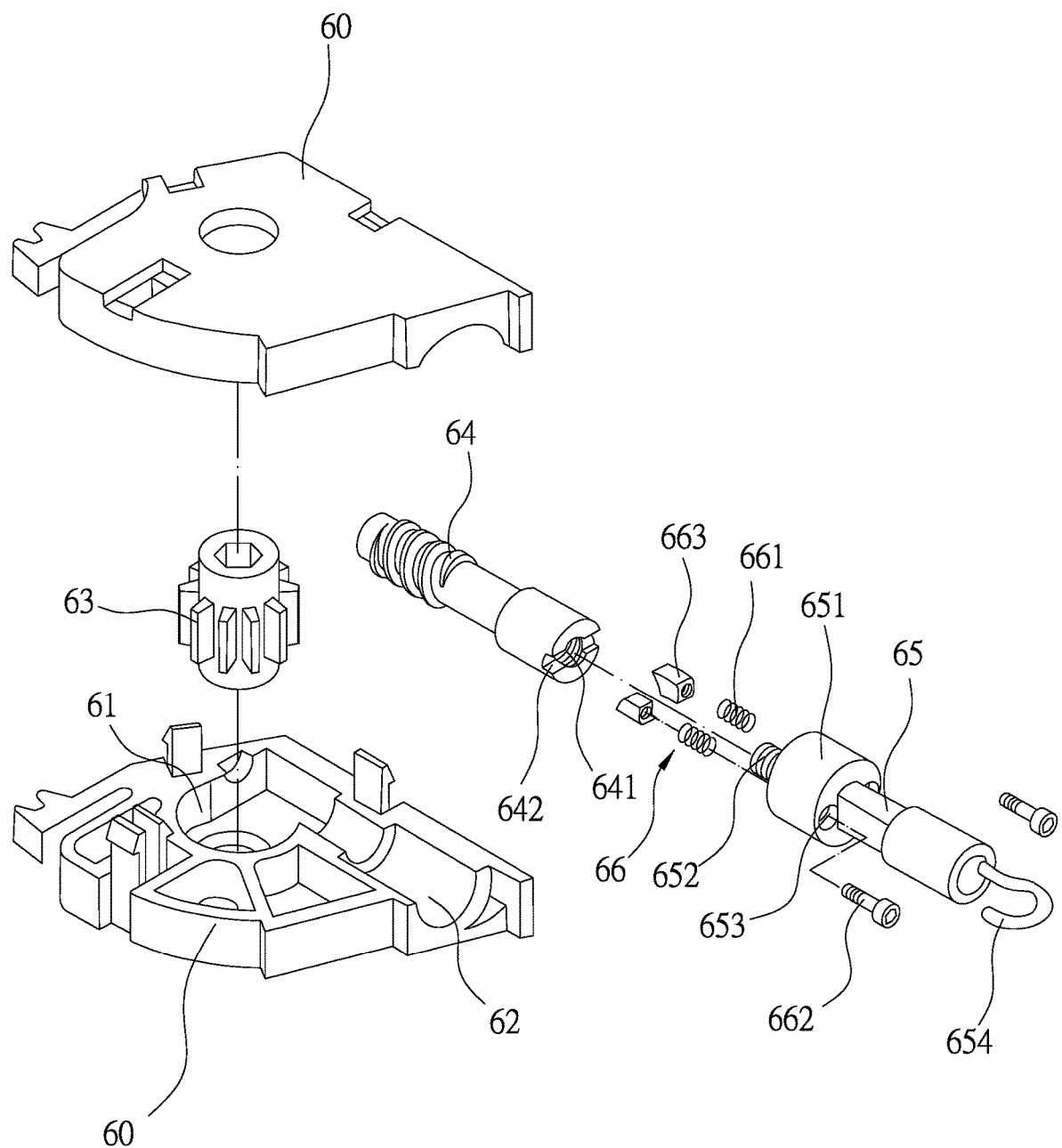
FIG. 15 is an exploded view of another conventional adjuster structure.
Figure 16:
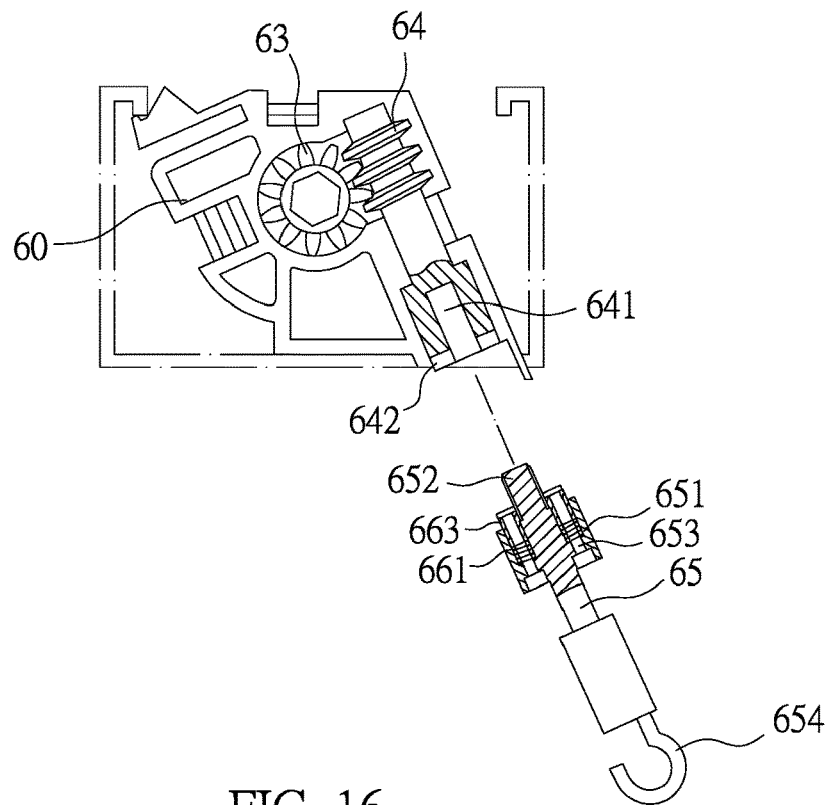
FIG. 16 is a schematic drawing showing the separation of the control rod of another conventional adjuster structure.
Figure 17:
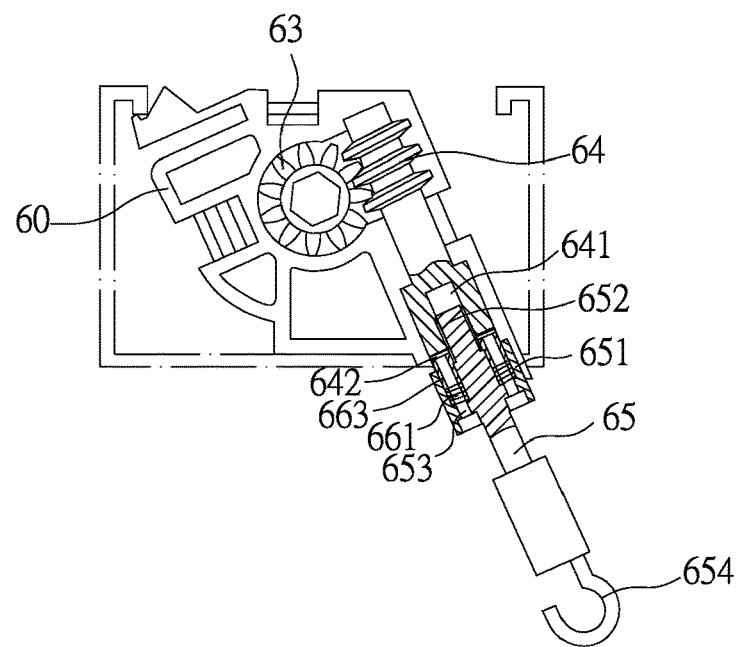
FIG. 17 is a schematic diagram of the control rod combination of another conventional adjuster structure.

Furthermore, the adjusting mechanism can provide the driving rods 24 with different lengths according to the size of the blinds blades 30 or the width of the blades 34. When the driving rod 24 is disassembled by the connecting rod 23, as shown in FIGS. 8 and 9, it is only necessary to use a rod to insert into the engaging aperture 242 and squeeze the engaging portion 235, the groove 234 on the pivot extension 233 has the ability of retracting and rebounding to squeeze the engaging portion 235 away from the engaging aperture 242, so that the driving rod 242 can be removed from the pivot extension 233 of the connecting rod 23, to replace the driving rod 24 with other dimensions. In addition, in order to assemble the driving rod 24, the engaging aperture 242 and the engaging portion 235 need to be aligned, and the pivot recess 341 is assembled into the pivot extension 233 to complete the assembly, which achieves the purpose of rapid disassembly and assembly.

With the structure of the above specific embodiment, the following benefits can be obtained: (1) The adjustment mechanism of the present invention has the worm 22 and the connecting rod 23 in the second container 13 of the casing 11, the worm 22 engages with the worm gear 21, and the pivot extension 233 at the end of the connecting rod 23 is located at the second opening 131 and does not protrude from the main body 10, which not only avoids damage and fracture during transportation, but also greatly reduce the volume of the adjust ent mechanism to achieve the purpose of reducing packaging volume. (2) The driving rod 24 used to connect the adjusting rod 32 of the blinds blades 30 is assembled and operated with the connecting rod 23, the pivot recess 241 of the driving rod 24 is inserted by the pivot extension 233 of the connecting rod 23 in a snap-fit manner and fastened together by the engagement of the engaging portion 235 and the engaging aperture 242 to achieve rapid disassembly and assembly. Furthermore, with several different lengths of the driving rods 24, the driving rod 24 can be changed freely according to the size of blinds blades 30, which greatly improves the applicability of the adjustment mechanism and the practicality of the structure.

Although the present invention has been explained in relation to its preferred embodiment, it is to be understood that many other possible modifications and variations can be made without departing from the spirit and scope of invention as hereinafter claimed.

What is claimed is:

1. An angle adjusting mechanism for blinds blades comprising:
    a main body comprising two casings defining a first container and a second container, the first container having a first opening through the two casings, and the second container having a second opening at an end; and
    a driving unit comprising a worm gear, a worm, a connecting rod and at least one driving rod, the worm gear disposed in the first container and having an assembling aperture at an axle center corresponding to the first opening, the worm combined with the connecting rod and installed in the second container, the worm engaging the worm gear, the connecting rod having a pivot extension at one end corresponding to the second opening, the pivot extension having an axial groove and an engaging portion on an outer side of the groove, the driving rod having a pivot recess at a first end with an engaging aperture through the driving rod, and the driving rod has a through aperture at a second end;
    wherein the worm gear, the worm and the connecting rod are positioned in the main body, the second opening of the second container is sized to accept the first end of the driving rod, and the first end of the driving rod is configured to extend into the second container so that the pivot recess of the driving rod accepts the pivot extension of the connecting rod for engagement; and
    wherein the pivot extension of the connecting rod further comprises a positioning protrusion, the pivot recess of the driving rod further comprises a guiding opening, and a positioning recess is disposed in the pivot recess, wherein by aligning the positioning recess and the positioning protrusion, the driving rod and the connecting rod are able to engage with each other.

2. The angle adjusting mechanism for blinds blades as claimed in claim 1, wherein the two casings further comprise a plurality of corresponding clasps and slots for combining the two casings together.

3. The angle adjusting mechanism for blinds blades as claimed in claim 1, wherein the worm and the connecting rod are integrally formed.

4. The angle adjusting mechanism for blinds blades as claimed in claim 1, wherein the worm further comprises a hexagonal socket at one end, the connecting rod further has a hexagonal column, and the worm and the connecting rod are combined via the hexagonal socket and the hexagonal column.

5. The angle adjusting mechanism for blinds blades as claimed in claim 4, wherein the hexagonal column of the connecting rod further comprises a groove extending downward at one end.

6. The angle adjusting mechanism for blinds blades as claimed in claim 1, further comprising a plurality of driving rods having different lengths.

* * * * *